United States Patent
Takamura et al.

(10) Patent No.: US 6,299,773 B1
(45) Date of Patent: Oct. 9, 2001

(54) POROUS POLYVINYLIDENE FLUORIDE RESIN FILM AND PROCESS FOR PRODUCING THE SAME

(75) Inventors: Masakazu Takamura, Koube; Hitoshi Yoshida, Iwaki, both of (JP)

(73) Assignee: Asahi Kasei Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/445,955

(22) PCT Filed: Jun. 22, 1998

(86) PCT No.: PCT/JP98/02762
§ 371 Date: Dec. 16, 1999
§ 102(e) Date: Dec. 16, 1999

(87) PCT Pub. No.: WO99/67013
PCT Pub. Date: Dec. 29, 1999

(51) Int. Cl.[7] .................................................. B01D 71/34
(52) U.S. Cl. ........................ 210/500.23; 210/500.42; 264/41; 264/177.14
(58) Field of Search .................... 210/500.42, 500.23; 264/41, 177.14, 184

(56) References Cited

U.S. PATENT DOCUMENTS

| | | | |
|---|---|---|---|
| 3,642,666 | * | 2/1972 | Bailey et al. . |
| 3,929,950 | * | 12/1975 | Nakamura et al. . |
| 4,177,228 | * | 12/1979 | Prolss . |
| 4,203,848 | * | 5/1980 | Gradube, II . |
| 4,806,291 | * | 2/1989 | Susa . |
| 4,810,384 | * | 3/1989 | Fabre . |
| 5,022,990 | * | 6/1991 | Doi et al. . |

FOREIGN PATENT DOCUMENTS

| | | |
|---|---|---|
| A5180686 | 7/1976 | (JP) . |
| A5893734 | 6/1983 | (JP) . |
| A1224005 | 9/1989 | (JP) . |
| A32115535 | 9/1991 | (JP) . |

* cited by examiner

Primary Examiner—Ana Fortuna
(74) Attorney, Agent, or Firm—Birch, Stewart, Kolasch & Birch, LLP

(57) ABSTRACT

A porous hollow fiber polyvinylidene fluoride resin membrane, characterized in that the membrane has a unitary three-dimensional network structure entirely composed of a polyvinylidene fluoride resin and has an inside diameter of 1.5–5 mm and a wall thickness of 0.5–2 mm and in that the relationship between membrane bubble point and water flux per unit wall thickness is on or above the curve shown in FIG. 1.

3 Claims, 1 Drawing Sheet

POROUS POLYVINYLIDENE FLUORIDE RESIN FILM AND PROCESS FOR PRODUCING THE SAME

This application is the national phase under 35 U.S.C. §371 of PCT International Application No. PCT/JP98/02762 which has an International filing date of Jun. 22, 1998 which designated the United States of America.

TECHNICAL FIELD

The present invention relates to a porous polyvinylidene fluoride resin membrane and a process for preparing the same. The membrane is excellent in chemical resistance, mechanical properties and water permeability and is therefore suitable for treatment of highly viscous liquids.

BACKGROUND ART

Polyvinylidene fluoride resins (PVDF) have been used as materials for porous resin membranes which are excellent in chemical resistance, heat resistance and mechanical properties.

In connection with these porous polyvinylidene fluoride resin membranes, for example, U.S. Pat. No. 5,022,990 discloses a process for producing a porous polyvinylidene fluoride membrane which comprises blending a polyvinylidene fluoride resin with an organic liquid and an inorganic particulate material and subsequently melt molding the resulting blend in the form of a hollow fiber, tubular or flat membrane. The porous membrane prepared with this process has a uniform, three-dimensional, network structure. Particularly, an example of the U.S. patent describes a porous hollow fiber membrane having an inside diameter of 1.10 mm and a wall thickness of 0.45 mm. However, if the inside diameter is increased to larger than this value during the process, the membrane pressure resistance lowers because the membrane wall stretches thin as the inside diameter increases. On the other hand, if both the inside diameter and the wall thickness are increased to larger than these values during the process, then there is the problem that the resulting porous hollow fiber membrane has such a decrease in water flux as to be impractical.

As described above, it has heretofore been impossible for any conventional technique to provide a porous hollow fiber polyvinylidene fluoride resin membrane which has excellent pressure resistance and high water flux despite having a large inside diameter and which is therefore suitable especially for treatment of highly viscous liquids.

DISCLOSURE OF THE INVENTION

It is an object of the present invention to provide a porous hollow fiber polyvinylidene fluoride resin membrane which is excellent in pressure resistance and water permeability despite having a large inside diameter.

It is another object of the present invention to provide a process for producing a porous hollow fiber polyvinylidene fluoride resin membrane which is excellent in pressure resistance and water permeability despite having a large inside diameter.

The porous hollow fiber membrane of the present invention is characterized in that the membrane has a unitary, three-dimensional, network pore structure composed entirely of a polyvinylidene fluoride resin and has an inside diameter of 1.5–5 mm and a wall thickness of 0.5–2 mm and in that the relationship between membrane bubble point (hereinafter referred to as BP) and water flux per unit membrane wall thickness is on or above the curve shown in FIG. 1.

According to the present invention, the production process of the porous hollow fiber membrane comprises blending a polyvinylidene fluoride resin with an organic liquid and an inorganic particulate material; heat melting the resulting blend at a temperature of 60° C. or more above the melting point of the resin; extruding the resulting molten blend in the form of a hollow fiber; passing the resulting hollow fiber-shaped extrudate through the air; and taking up the extrudate.

BEST MODE OF PRACTICING THE INVENTION

Figure 1:
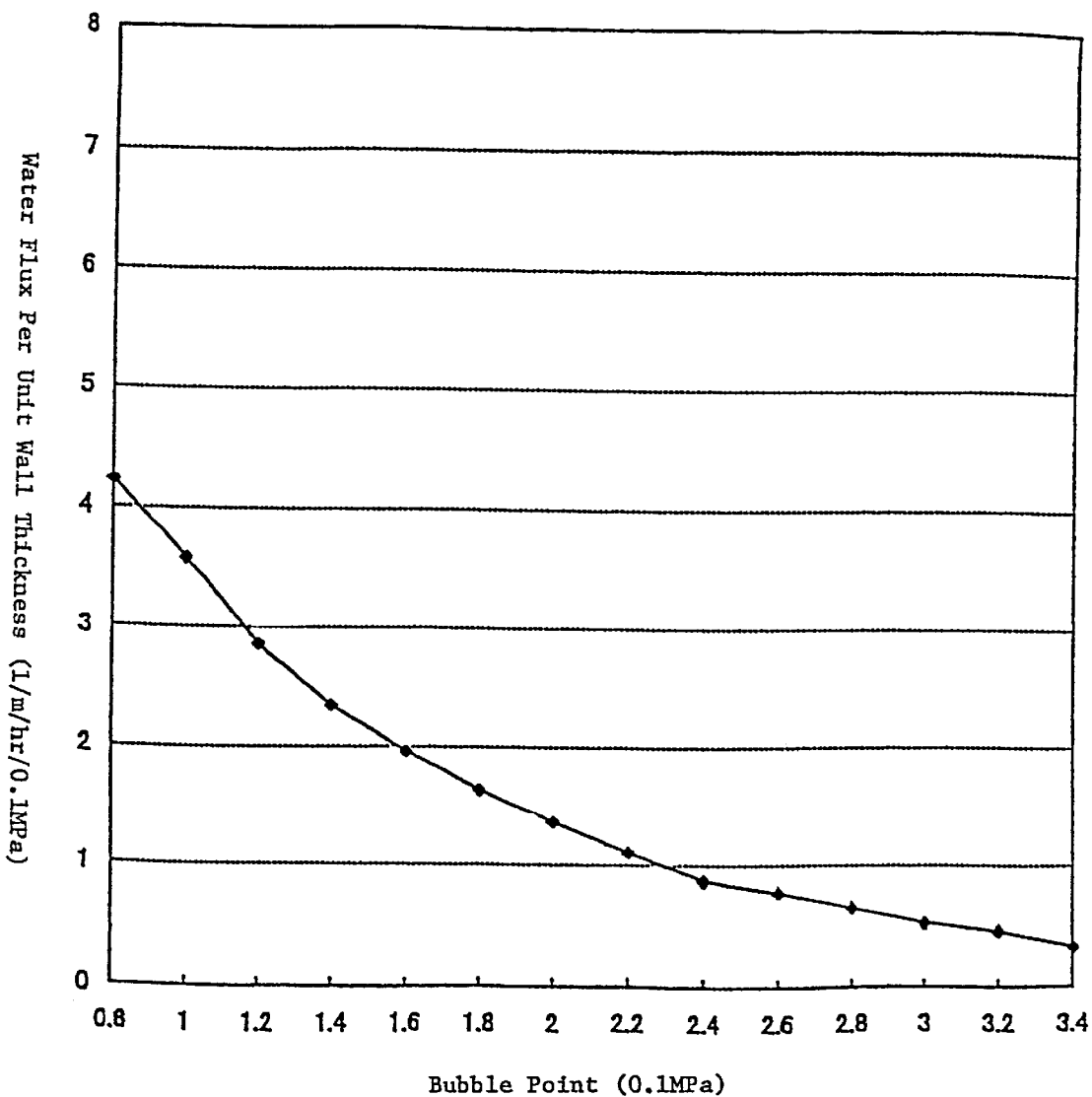
FIG. 1 shows a relationship between membrane bubble point and water flux per unit membrane wall thickness.

As polyvinylidene fluoride resins from which the porous membrane of the present invention is prepared, there are vinylidene fluoride homopolymers and copolymers. Examples of the vinylidene fluoride copolymers used according to the present invention include copolymers of vinylidene fluoride and one or more selected from the group consisting of tetrafluoroethylene, tetrafluoropropylene, trifluoromonochloro-ethylene and ethylene. Preferably, the vinylidene fluoride homopolymers are used. Further, mixtures of these polymers may also be used.

The porous hollow fiber membrane of the present invention, which is composed entirely of a polyvinylidene fluoride resin, has a unitary, three-dimensional, network pore structure throughout the whole thereof. Further, the membrane has highly uniform micropores with openings on the membrane surface at a high ratio without the presence of macrovoids therein although it has a large wall thickness.

The porous hollow fiber membrane of the present invention has an inside diameter of 1.5–5 mm and a wall thickness of 0.5–2 mm. The excellent pressure resistance which results from the large inside diameter and the thick wall of the porous hollow fiber membrane makes it possible to subject a highly concentrated and highly viscous liquid to crossflow or circulation filtration at a high linear velocity while keeping a lower pressure loss in the bore of the membrane. If the inside diameter of a porous hollow fiber membrane is less than 1.5 mm, the permeate-to-feed concentration ratio does not increase while filtering a highly viscous liquid because of its large pressure loss in the bore of the membrane. If the inside diameter of a hollow fiber membrane exceeds 5 mm, the surface area of the membrane which can be housed in a module is too small for practical use because of the limited capacity of the module. In view of the relationship between the pressure loss in the membrane bore and the membrane surface area, the inside diameter ranges preferably from 1.7 mm to 4 mm and more preferably from 2 mm to 3.5 mm.

As the membrane wall thickness increases, the membrane pressure resistance improves but pressure loss becomes larger within the flow channels in the direction of the wall thickness, so that water permeability tends to degrade. In view of the relationship between the membrane pressure resistance and the water permeability, the wall thickness ranges preferably from 0.5 mm to 2 mm.

The porous hollow fiber polyvinylidene fluoride resin membrane of the present invention, which has such a large inside diameter and wall thickness as mentioned above, has a pore diameter ranging preferably from 0.8 to 3.4 and more preferably from 1.3 to 3.3 in terms of the bubble point expressed as a multiple of unit 0.1 MPa.

Furthermore, the porous hollow fiber polyvinylidene fluoride resin membrane of the present invention has a relationship between bubble point (expressed as a multiple of unit 0.1 MPa) and water flux per unit wall thickness (expressed as 1/m/hr/0.1 MPa at 25° C.) which is on or above the curve shown in FIG. 1.

The present invention will be described below with reference to a typical production method of a porous hollow fiber polyvinylidene fluoride resin membrane.

According to the present invention, the production method of the porous hollow fiber polyvinylidene fluoride resin membrane comprises blending a polyvinylidene fluoride resin with an organic liquid and an inorganic particulate material; heat melting the resulting blend at a temperature of 60° C. or more above the melting point of the resin; extruding the resulting molten blend in the form of a hollow fiber; passing the resulting hollow fiber-shaped extrudate through the air; and taking up the extrudate.

In membranes having a homogeneously porous structure at a given pore diameter, membrane wall thickness and water flux are inversely proportional. A thin porous hollow fiber membrane having a wall thickness of 0.40 mm or less may be prepared by a conventional spinning technique. The membrane thus prepared has a relatively homogeneous structure, irrespective of spinning conditions, and the water flux of the membrane tends to be almost inversely proportional to its wall thickness.

However, if the wall thickness is further increased during the production of the hollow fiber membranes under the conventional spinning technique, the structure of the membranes tends to become asymmetrical or heterogeneous, and thus it is impossible to obtain a homogeneous structure in the direction of the wall thickness. For such membranes, even if their pore diameter is the same as that of the membranes with a homogeneously porous structure, a decrease in the water flux with increasing wall thickness will be larger than that indicated by an inversely proportional relationship between wall thickness and water flux of the homogeneously porous membranes. Porous hollow fiber membranes such as those obtained according to the present invention, having a wall thickness of 0.5 mm–2 mm and a large water flux, cannot be obtained by the conventional production methods.

The membrane production process of the present invention comprises a combination of steps which include blending of a polyvinylidene fluoride resin with an organic liquid and an inorganic particulate material; heat melting of the resultant blend at a temperature of 60° C. or more above the melting point of the resin (which has not been performed in any conventional technique); passing the resulting hollow fiber-shaped extrudate through the air; and taking-up of the extrudate. This combination of the steps provides a membrane which has excellent permeability and highly uniform micropores with openings on its surface at a high ratio despite having a large wall thickness.

The polyvinylidene fluoride resins used in accordance with the present invention include vinylidene fluoride homopolymers and copolymers. As the vinylidene fluoride copolymers, there are used copolymers of vinylidene fluoride and one or more selected from the group consisting of tetrafluoroethylene, hexafluoropropylene, trifluoromonochloro-ethylene and ethylene; however, the vinylidene fluoride homo-polymers are preferably used. These polymers may be used in combination.

The polyvinylidene fluoride resin of the present invention has a weight average molecular weight (Mw) ranging preferably from 100,000 to 600,000. If a polyvinylidene fluoride resin having a weight average molecular weight (MW) of less than 100,000 is used, the resulting porous membrane is brittle because the tensile elongation of the membrane is 50% or lower, so that the use of such a membrane would be impractical. If a polyvinylidene fluoride resin having a Mw of more than 600,000 is used, the moldability of the resulting blend becomes unacceptable when the blend is extruded in the form of a hollow fiber because of low melt flowability of the resin and further, the average pore diameter becomes smaller than 0.01 $\mu$m on the surface of the hollow fiber membrane having a network structure composed of the resin. This results in an undesirably decrease in pore opening area and porosity and in degradation of water permeability.

The organic liquid used according to the present invention is required to be a liquid which is inactive in the melt molding process. The solubility parameter (hereinafter referred to as SP) of the organic liquid ranges preferably from 8.4 to 10.5 and more preferably from 8.4 to 9.9. Such an organic liquid having the above-mentioned SP range may be dissolved in the polyvinylidene fluoride resin to a proper degree in the melt molding process and may be mostly adsorbed on the surface of an inorganic particulate material in the resulting extrudate when the extrudate is cooled and solidified. This makes it possible to provide the resulting blend with excellent moldability and to improve extractability of the particulate material and the liquid from the extrudate, thereby facilitating production of a porous hollow fiber membrane having excellent mechanical strength.

If the SP of the organic liquid exceeds 10.5, the high solubility of the liquid in the polyvinylidene fluoride resin under a molten condition tends to prevent microphase separation at the time of cooling. This increases the melt-bonding between the resin molecules, which results in increased membrane mechanical strength, and yet decreases the pore-forming effect of the organic liquid, which brings about a large shrinkage of the resulting hollow fiber-shaped extrudate upon extraction of the organic liquid and the inorganic particulate material. This shrinkage results in a decrease in porosity and deterioration in appearance of the resulting membrane. On the other hand, if the SP of the organic liquid is less than 8.4, the low solubility of the organic liquid in the molten resin brings about the liberation of the organic liquid during the melt molding process, which results in the prevention of melt-bonding between the resin molecules, the degradation in the moldability of the resulting blend, an increase in average pore diameter in the network structure of the resulting polyvinylidene fluoride resin membrane, and a decrease in the tensile strength and the tensile elongation of the membrane.

Examples of the organic liquids having an SP of 8.4–10.5, which are employed according to the present invention, include phthalic esters such as diethyl phthalate (DEP), dibutyl phthalate (DBP), dioctyl phthalate (DiOP) bis(2-ethylhexyl) phthalate (BEHP) and the like; phosphoric esters and the like. Of these, bis(2-ethylhexyl) phthalate, dibutyl phthalate and mixtures thereof are particularly preferred.

The inorganic particulate material employed in the process of the present invention functions as a carrier for retaining the organic liquid and as nuclei in microphase separation. Specifically, this material prevents liberation of the organic liquid during the melt molding process to increase moldability and functions as nuclei for microphase separation to facilitate a high-degree of microdispersion of the organic liquid, which strictly prevents aggregation of the dispersed liquid particles. In addition, the inorganic particulate material functions as a substance for membrane pore formation in combination with subsequent extraction of the material.

Among inorganic particulate materials, silica is preferred and especially, hydrophobic silica is preferred. The hydrophobic silica refers to a silica of which the surface is converted from hydrophilicity to hydrophobicity by the chemical substitution of the silanol groups in the hydrophilic surface layer of the silica with methyl groups of an organosilicon compound such as dimethylsilane, dimethyl dichorosilane or the like. Preferably, the hydrophobic silica has an average primary particle diameter of 0.005–0.5 $\mu$m, a specific surface area of 30–500 $m^2/g$ and a methanol wettability (MW) of 30% by volume or more in terms of the volume of methanol completely wetting the silica. The hydrophobic silica prevents its aggregation during the melt molding process and is superior to a hydrophilic silica in affinity for the hydrophobic polyvinylidene fluoride resin and the organic liquid to thereby attain a high-degree microdispersion of the hydrophobic silica. Presumably, this may prevent formation of macrovoids and makes it possible to provide a porous polyvinylidene fluoride resin membrane having a macrovoid-free, uniform, three-dimensional, network pore structure composed of micropores throughout the membrane.

According to the present invention, the blend of the above-mentioned starting materials comprises 35–50% by weight of the polyvinylidene fluoride resin, 30–45% by weight of the organic liquid and 20–30% by weight of the inorganic particulate material.

If the content of the polyvinylidene fluoride resin is less than 35% by weight, the moldability of the blend is not preferable and the mechanical strength of the resultant porous membrane is low since the quantity of the resin is too small. If the resin content exceeds 50% by weight, on the other hand, the resultant porous membrane is low in porosity, so that water flux tends to decrease.

If the content of the organic liquid is less than 30% by weight, contribution of the organic liquid to pore formation is decreased to lower the porosity of the resulting membrane to less than 40% and it is therefore difficult to obtain an effective porous membrane. On the other hand, if the content of the liquid exceeds 45% by weight, it is difficult to obtain a porous membrane which is excellent in mechanical strength because of the difficulty in molding of the blend.

If the content of the inorganic particulate material is less than 20% by weight, the amount of the material is not sufficient for adsorption of the organic liquid necessary for production of a practical porous membrane, so that the inorganic particulate material cannot be kept in a pulverized or granular condition, which makes it difficult to mold the blend. On the other hand, if the content of the particulate material is more than 30% by weight, the melt flowability of the blend is deteriorated and the resultant porous membrane tends to be brittle.

According to the present invention, a blend used for melt molding primarily comprises three materials which include a polyvinylidene fluoride resin, an inorganic particulate material and an organic liquid. If necessary, lubricants, antioxidants, ultraviolet absorbers, plasticizers and other molding additives may be added to the blend in such quantities that they do not have an unwanted influence on the resultant porous membrane.

These three materials may be blended with each other according to an ordinary blending method by use of a blender such as a Henschel mixer, V-shaped blender, ribbon blender or the like. As an order of blending the three materials, there is a blending method which comprises blending of the inorganic particulate material with the organic liquid to cause the particulate material to sufficiently adsorb the organic liquid and subsequent blending of the polyvinylidene fluoride resin with the resulting blend. This blending method is more advantageous than the simultaneous blending of the three materials for enhancing the melt moldability of the resulting blend and increasing the porosity and mechanical strength of the resulting porous membrane. The blend is melt kneaded with a melt-kneading apparatus such as an extruder, a Banbury mixer, a twin-roll mill, a kneader or the like. The resulting kneaded blend is melt molded in the form of a hollow fiber through a die designed therefor. The blend may also be melt kneaded and extruded into a hollow fiber membrane in a continuous process by use of an apparatus such as an extruder, a kneader or the like which functions to both melt knead and melt extrude therein.

According to the present invention, it is necessary to heat melt the blend during the melt kneading and/or melt extrusion process at a temperature of 60° C. or more above the melting point of the polyvinylidene fluoride resin in order to prepare a porous hollow fiber membrane having a large inside diameter, a large wall thickness and excellent water permeability. If a porous hollow fiber membrane having a large inside diameter and a large wall thickness is extruded without heat melting the blend at such a temperature of 60° C. or more above the melting point of the resin as in the present invention, the water flux of the membrane is lowered because uniform pores are not formed throughout the membrane. It is thought that the heat melting of the blend at a temperature of 60° C. or more above the resin melting point increases solubility of the organic liquid in the molten resin, further promotes homogeneity of the molten blend of the resin and the organic liquid, and lowers the viscosity of the molten blend to make the microdispersion of the solid inorganic particulate material more uniform. Presumably, the uniformity of the microdispersion leads to that of microphase separation in the subsequent process of cooling, which causes the resulting membrane to have a uniformly porous structure despite having a large wall thickness, so that the membrane exhibits excellent water permeability. The maximum temperature in the melt kneading and/or melt extrusion of the present invention is the decomposition temperature of the poly-vinylidene fluoride resin.

According to the present invention, after the blend is extruded in the form of a hollow fiber, it is necessary to pass the resulting extrudate through the air between a hollow fiber spinning nozzle and a cooling bath and to take up the extrudate. The passing of the extrudate through the air for a distance may increase the pore opening ratio on the surface of the porous membrane, which results in an increase in the water flux of the membrane. The distance for passing the hollow fiber-shaped extrudate through the air depends on its take-up rate and ranges preferably from 20 to 150 cm and more preferably from 30 to 100 cm. If the distance is less than 20 cm, the water flux of the resulting membrane is decreased because quenching of the extrudate forms a skin layer having a lower pore opening ratio on membrane surface. The distance in excess of 150 cm deteriorates the tensile strength of the molten extrudate in the form of a hollow fiber, so that the uniformity of the hollow fiber diameter is difficult to obtain because of diameter fluctuation.

The cooling bath is necessary for the final setting of the extrudate in the form of a hollow fiber. Examples of cooling media which are preferably employed include water and plasticizers. The cooling bath may be replaced by contact with a cooled gas.

Extraction of the organic liquid from the obtained hollow fiber-shaped extrudate is followed by that of the inorganic particulate material from said extrudate. Solvents used to extract the organic liquid are required to be those that are capable of dissolving the liquid without substantially dissolving the polyvinylidene fluoride resin. Examples of the solvents used for the extraction include methanol, acetone, methyl ethyl ketone and the like, but halogenated hydrocarbons such as methylene chloride, trichloroethylene and the like are particularly preferable. Examples of solvents used for extraction of the inorganic particulate material include aqueous alkaline solutions such as aqueous sodium hydroxide solutions and aqueous potassium hydroxide solutions. Further, it is possible to extract the organic liquid and the inorganic particulate material at the same time by use of an alcoholic solution of sodium hydroxide or the like.

Furthermore, it is possible to stretch the porous hollow fiber membrane in order to increase the pore size and porosity after extraction of either or both of the organic liquid and the inorganic particulate material.

A direct or relative decrease in resin content makes it possible to prepare a porous hollow fiber membrane having a BP of less than 0.8 (expressed as a multiple of unit 0.1 MPa) but deteriorates the moldability of the resulting blend and decreases the mechanical strength of the resulting membrane to such an extent that said membrane may not be fit for practical use. An extreme increase in the resin content or quenching of a molten extrudate makes it possible to prepare a porous hollow fiber membrane having a BP of more than 3.4 (also expressed as a multiple of unit 0.1 MPa) but decreases membrane porosity and forms a skin layer on the membrane surface, so that it is difficult to obtain an improved water permeability.

Hereinafter, the present invention will be described in more detail with reference to the following examples, which are not to be construed as limiting the present invention. The properties described herein were determined by the following methods.

(1) Weight average molecular weight (Mw): Measured by GPC in terms of the molecular weight of polystyrene.

GPC equipment: Model LS-8000, manufactured by Toyo Soda Kogyo K.K., Japan.

Column: GMHXL

Solvent: Dimethylformamide

Column temperature: 40° C.

(2) Solubility parameter (SP): Calculated by the following formula (the formula of P.A. Small):

$$SP=d\Sigma G/M$$

wherein d is specific gravity, G is molar attraction constant and M is molecular weight.

(3) Methanol wettability (MW): % by volume of methanol with which a particulate material is completely wetted. 0.2 g of the particulate material is placed in a beaker and 50 ml of purified water is added thereto. Methanol is introduced below the surface of the water under agitation with a magnetic stirrer until any particulate material is not observed on the surface of the water. The total amount of the methanol introduced is measured and MW (% by volume) is calculated by the following formula:

$$MW=100\times Y/(50+Y)$$

wherein Y represents the volume of methanol introduced (ml).

(4) Average pore diameter ($\mu$m): Measured by the half-dry method prescribed in ASTM F316-86.

Impregnating liquid used: Denatured ethanol (surface tension: 22.3 dyn/cm at 25° C.)

(5) Maximum pore diameter (pm): Measured by the bubble point method prescribed in ASTM F316-86.

Impregnating liquid used: Denatured ethanol (surface tension: 22.3 dyn/cm at 25° C.)

(6) Water flux per unit wall thickness (1/m/hr/0.1MPa at 25° C.): A porous hollow fiber is cut in a length of 20 cm. The quantity of permeate through the fiber is measured at a trans-membrane pressure of 0.1 MPa at 25° C. for one minute. The water flux per unit membrane wall thickness is calculated from the quantity of the obtained permeate by the following formula:

water flux/unit wall thickness=quantity of permeate×membrane wall thickness×60/(fiber length×fiber ID×$\pi$)

EXAMPLE 1 (This Invention)

23.1% by weight of hydrophobic silica (Japan Aerosil R-972, trade name) having a MW of 50%, an average primary particle diameter of 16 nm and a specific surface area of 110 m$^2$/g; 30.7% by weight of bis(2-ethylhexyl) phthalate having a SP of 8.9; and 6.2% by weight of dibutyl phthalate having a SP of 9.4 were blended together in a Henschel mixer. To the resulting blend, 40.0% by weight of polyvinylidene fluoride (Kureha KF Polymer #1000, trade name) having a Mw of 242,000 and a melting point of 177° C. was added, followed by further blending with each other in said Henschel mixer.

The resultant blend was melt kneaded and was pelletized with a twin-screw extruder having a barrel diameter of 30 mm. The resulting pellets were melt kneaded at 250° C. by use of a twin-screw extruder having a barrel diameter of 30 mm and equipped with an annular hollow fiber spinning die nozzle and was then extruded through the nozzle having an outside diameter of 5.8 mm and an inside diameter of 3.5 mm. The resulting extrudate was cooled while passing it through the air for a distance of 30 cm, further cooled in a water bath and taken up at a spinning rate of 5 m/min. The hollow fiber-shaped extrudate thus obtained was immersed in methylene chloride for one hour to extract bis(2-ethylhexyl) phthalate and dibutyl phthalate and was then dried. Subsequently, the extrudate was immersed in a 50% aqueous solution of ethyl alcohol for 30 minutes to make the extrudate hydrophilic. Further, the extrudate was immersed in a 20% aqueous solution of sodium hydroxide at 70° C. for one hour to extract the hydrophobic silica and was then subjected to water washing and drying.

The properties of the hollow fiber membrane thus obtained are shown in Tables 1 and 2. Measurement of the membrane indicates that the relationship between BP and water flux per unit wall thickness is above the curve shown in FIG. 1.

EXAMPLE 2 (This Invention)

25.0% by weight of hydrophobic silica (Japan Aerosil R-972, trade name) having a MW of 50%, an average primary particle diameter of 16 nm and a specific surface area of 110 m$^2$/g; 28.0% by weight of bis(2-ethylhexyl) phthalate having a SP of 8.9; and 7.0% by weight of dibutyl phthalate having a SP of 9.4 were blended together in a Henschel mixer. To the resulting blend, 40.0% by weight of polyvinylidene fluoride (Kureha KF Polymer #1000, trade name) having a Mw of 242,000 and a melting point of 177°

C. was added, followed by further blending with each other in said Henschel mixer. Except for use of the resulting blend, a hollow fiber membrane was prepared in the same way as described in Example 1.

The properties of the hollow fiber membrane thus prepared are shown in Tables 1 and 2. Measurement of the membrane indicates that the relationship between BP and water flux per unit wall thickness is above the curve shown in FIG. 1.

EXAMPLE 3 (This Invention)

22.9% by weight of hydrophobic silica (Japan Aerosil R-972, trade name) having a MW value of 50%, an average primary particle diameter of 16 nm and a specific surface area of 110 m²/g; 25.7% by weight of bis(2-ethylhexyl) phthalate having a SP of 8.9; and 6.4% by weight of dibutyl phthalate having a SP of 9.4 were blended with each other in a Henschel mixer. To the resulting blend, 45.0% by weight of polyvinylidene fluoride (Kureha KF Polymer #1000, trade name) having a Mw of 242,000 and a melting point of 177° C. was added, followed by further blending with each other in said Henschel mixer to obtain a blend. Except for the specific blend, a hollow fiber membrane was prepared in the same way as described in Example 1.

The properties of the hollow fiber membrane thus prepared are shown in Tables 1 and 2. Measurement of the membrane indicates that the relationship between BP and water flux per unit wall thickness is above the curve shown in FIG. 1.

EXAMPLE 4 (Comparative)

Example 1 was repeated to prepare a hollow fiber membrane except for melt kneading the pellets at 230° C. by use of a twin-screw extruder having a barrel diameter of 30 mm.

The properties of the hollow fiber membrane thus prepared are shown in Tables 1 and 2. Measurement of the membrane indicates that the relationship between BP and water flux per unit wall thickness is below the curve shown in FIG. 1.

EXAMPLE 5 (Comparative)

Example 2 was repeated to obtain a hollow fiber membrane except for a 10 cm distance for air cooling immediately after melt extrusion process by use of a hollow fiber production apparatus equipped with an annular die nozzle having an outside diameter of 5.8 mm and an inside diameter of 3.5 mm.

The properties of the hollow fiber membrane thus prepared are shown in Tables 1 and 2. Measurement of the membrane indicates that the relationship between BP and water flux per unit wall thickness is below the curve shown in FIG. 1.

TABLE 1

|  | Composition (wt. %) | | | | Resin Temp. (° C.) | Air Cooling Distance (cm) |
|---|---|---|---|---|---|---|
|  | Silica | BEHP | DBP | PVDF | | |
| Example 1 (This Invention) | 23.1 | 30.7 | 6.2 | 40.0 | 250 | 30 |
| Example 2 (This Invention) | 25.0 | 28.0 | 7.0 | 40.0 | 250 | 30 |
| Example 3 (This Invention) | 22.9 | 25.7 | 6.4 | 45.0 | 250 | 30 |
| Example 4 (Comparative) | 23.i | 30.7 | 6.2 | 40.0 | 230 | 30 |
| Example 5 (Comparative) | 25.0 | 28.0 | 7.0 | 40.0 | 250 | 10 |

TABLE 2

|  | OD/ID (mm) | Average Pore Dia. (μm) | BP (0.1 MPa) | Max. Pore Dia. (μm) | Water Flux Per Unit Wall Thickness (1/m/hr/0.1 MPa) |
|---|---|---|---|---|---|
| Example 1 (This Invention) | 3.9/2.6 | 0.39 | 1.38 | 0.63 | 2.41 |
| Example 2 (This Invention) | 3.9/2.6 | 0.24 | 2.30 | 0.38 | 1.00 |
| Example 3 (This Invention) | 3.9/2.6 | 0.17 | 3.25 | 0.27 | 0.43 |
| Example 4 (Comparative) | 3.9/2.6 | 0.46 | 1.18 | 0.74 | 2.37 |
| Example 5 (Comparative) | 3.9/2.6 | 0.22 | 2.50 | 0.35 | 0.72 |

Industrial Applicability

The membrane of the present invention is a porous hollow fiber polyvinylidene fluoride resin membrane having a large inside diameter and a large wall thickness. The membrane is especially useful for filtration of highly viscous liquids because of excellent water permeability. The large inside diameter makes it possible to reduce pressure loss in membrane bore to a lower level, the large wall thickness which results in excellent pressure resistance makes it possible to apply high filtration pressure to the membrane, and further, the excellent water permeability makes it possible to highly concentrate the highly viscous liquids with great efficiency. The membrane of the present invention makes it possible to efficiently perform solid-liquid separation while filtering such a liquid even though crystallization is apt to occur at low temperatures as the viscosity of the liquid is increased because of lowered filtration temperatures. Therefore, the membrane of the present invention may be applied to purification of vegetable oils such as sunflower oil, rape seed oil and the like; purification of mineral oils and chemicals; recovery of useful substances from fermentation broths in the production of beer, sugars and the like; and recovery of useful substances from fermentation broths in the manufacture of amino acids and the like. The membrane of the present invention makes it possible to achieve higher concentrations of liquids than have been possible with conventional membranes, so that the inventive membrane is expected to see an expanded application field for filtration of highly viscous liquids.

What is claimed is:

1. A porous hollow fiber polyvinylidene fluoride resin membrane, characterized in that the membrane has a unitary, three-dimensional, network pore structure composed entirely of a polyvinylidene fluoride resin and has an inside diameter of 1.5–5 mm and a wall thickness of 0.5–2 mm and wherein the relationship between membrane bubble point and water flux per unit wall thickness is on or above the curve shown in FIG. 1, wherein the bubble point is expressed as a multiple of unit 0.1 Mpa and the water flux per unit wall thickness is expressed as 1/m/hr/0.1 Mpa at 25° C.

2. A process for producing a porous hollow fiber polyvinylidene fluoride resin membrane, which comprises blending a polyvinylidene fluoride resin with an organic liquid and an inorganic particulate material, heat melting the resulting blend at a temperature of 60° C. or more above the melting point of the resin by using a melt molded extruder equipped with an annular hollow fiber spinning die nozzle, extruding the molten blend in the form of a hollow fiber, passing the resultant hollow fiber-shaped extrudate through the air and taking up said extrudate.

3. The process according to claim 2, wherein said extrudate is passed through the air for a distance of from 20 to 150 cm.

* * * * *